(12) United States Patent
Shafer et al.

(10) Patent No.: US 8,179,814 B2
(45) Date of Patent: May 15, 2012

(54) AUTOMATIC RETURN PATH SWITCHING FOR A SIGNAL CONDITIONING DEVICE

(75) Inventors: Steven K. Shafer, Chittenango, NY (US); Michael E. Lawrence, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 413 days.

(21) Appl. No.: 12/483,794

(22) Filed: Jun. 12, 2009

(65) Prior Publication Data
US 2010/0251320 A1    Sep. 30, 2010

Related U.S. Application Data

(60) Provisional application No. 61/164,813, filed on Mar. 30, 2009.

(51) Int. Cl.
*H04L 12/28* (2006.01)
(52) U.S. Cl. .................. 370/252; 370/465; 725/127
(58) Field of Classification Search .......... 370/252, 370/253, 464, 465; 725/118, 119, 121, 122, 725/127, 128
See application file for complete search history.

(56) References Cited

U.S. PATENT DOCUMENTS

| | | |
|---|---|---|
| 3,790,909 A | 2/1974 | Le Fevre |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,961,218 A | 10/1990 | Kiko |
| 4,963,966 A | 10/1990 | Harney et al. |
| 4,982,440 A | 1/1991 | Dufresne et al. |
| 5,010,399 A | 4/1991 | Goodman et al. |
| 5,126,840 A | 6/1992 | Dufresne et al. |
| 5,194,947 A | 3/1993 | Lowcock et al. |
| 5,214,505 A | 5/1993 | Rabowsky et al. |
| 5,231,660 A | 7/1993 | West, Jr. |
| 5,369,642 A | 11/1994 | Shioka et al. |
| 5,548,255 A | 8/1996 | Spielman |

(Continued)

FOREIGN PATENT DOCUMENTS
JP     55080989 A    6/1980
(Continued)

OTHER PUBLICATIONS

PCT/US2010/024077; International Search Report and Written Opinion. Date of Mailing: Jul. 29, 2010. 9 pp.

(Continued)

*Primary Examiner* — Pao Sinkantarakorn
(74) *Attorney, Agent, or Firm* — Schmeiser Olsen & Watts

(57) ABSTRACT

A premise signal conditioning device is provided that can be inserted into a signal transmission line of a CATV system on a premise of a user. The device includes at least a first diplexer set, each diplexer set including a supplier side diplexer and a premise side diplexer creating a return path for an upstream bandwidth and a forward path for a downstream bandwidth there between. The device further includes a detector configured to measure a level of signals present in a first segment of frequencies between the upstream bandwidth and the downstream bandwidth. The device further includes a switch controller configured to alter a width of the return path from a first width to a second width in response to a level of the signals exceeding a predetermined threshold level.

26 Claims, 7 Drawing Sheets

U.S. PATENT DOCUMENTS

| | | | |
|---|---|---|---|
| 5,745,836 | A | 4/1998 | Williams |
| 5,815,794 | A | 9/1998 | Williams |
| 5,839,052 | A | 11/1998 | Dean et al. |
| 5,893,024 | A | 4/1999 | Sanders et al. |
| 5,937,330 | A | 8/1999 | Vince et al. |
| 5,950,111 | A | 9/1999 | Georger et al. |
| 5,970,053 | A | 10/1999 | Schick et al. |
| 6,014,547 | A | 1/2000 | Caporizzo et al. |
| 6,049,693 | A | 4/2000 | Baran et al. |
| 6,069,960 | A | 5/2000 | Mizukami et al. |
| 6,094,211 | A | 7/2000 | Baran et al. |
| 6,205,138 | B1 | 3/2001 | Nihal et al. |
| 6,348,837 | B1 | 2/2002 | Ibelings |
| 6,348,955 | B1 | 2/2002 | Tait |
| 6,373,349 | B2 | 4/2002 | Gilbert |
| 6,377,316 | B1 | 4/2002 | Mycynek et al. |
| 6,388,539 | B1 | 5/2002 | Rice |
| 6,425,132 | B1 | 7/2002 | Chappell |
| 6,495,998 | B1 | 12/2002 | Terreault |
| 6,498,925 | B1 | 12/2002 | Tauchi |
| 6,510,152 | B1 | 1/2003 | Gerszberg et al. |
| 6,560,778 | B1 | 5/2003 | Hasegawa |
| 6,570,928 | B1 | 5/2003 | Shibata |
| 6,587,012 | B1 | 7/2003 | Farmer et al. |
| 6,622,304 | B1 | 9/2003 | Carhart |
| 6,640,338 | B1 | 10/2003 | Shibata |
| 6,678,893 | B1 | 1/2004 | Jung |
| 6,683,513 | B2 | 1/2004 | Shamsaifar et al. |
| 6,725,462 | B1 | 4/2004 | Kaplan |
| 6,728,968 | B1 | 4/2004 | Abe et al. |
| 6,757,910 | B1 | 6/2004 | Bianu |
| 6,804,828 | B1 | 10/2004 | Shibata |
| 6,845,232 | B2 | 1/2005 | Darabi |
| 6,877,166 | B1 | 4/2005 | Roeck et al. |
| 6,928,175 | B1 | 8/2005 | Bader et al. |
| 7,003,275 | B1 | 2/2006 | Petrovic |
| 7,029,293 | B2 | 4/2006 | Shapson et al. |
| 7,039,432 | B2 | 5/2006 | Strater et al. |
| 7,162,731 | B2 | 1/2007 | Reidhead et al. |
| 7,283,479 | B2 | 10/2007 | Ljungdahl et al. |
| 7,454,252 | B2 | 11/2008 | El-Sayed |
| 7,505,819 | B2 | 3/2009 | El-Sayed |
| 7,530,091 | B2 | 5/2009 | Vaughan |
| 8,005,132 | B2 * | 8/2011 | Herzberg ............ 375/224 |
| 2001/0016950 | A1 | 8/2001 | Matsuura |
| 2002/0128006 | A1 | 9/2002 | Martine et al. |
| 2002/0141347 | A1 | 10/2002 | Harp et al. |
| 2002/0144292 | A1 | 10/2002 | Uemura et al. |
| 2002/0166124 | A1 | 11/2002 | Gurantz et al. |
| 2004/0172659 | A1 | 9/2004 | Ljungdahl et al. |
| 2004/0229561 | A1 | 11/2004 | Cowley et al. |
| 2005/0034168 | A1 | 2/2005 | Beveridge |
| 2005/0183130 | A1 | 8/2005 | Sadja et al. |
| 2005/0283815 | A1 | 12/2005 | Brooks et al. |
| 2005/0289632 | A1 | 12/2005 | Brooks et al. |
| 2006/0015921 | A1 | 1/2006 | Vaughan |
| 2006/0205442 | A1 | 9/2006 | Phillips et al. |
| 2006/0282871 | A1 | 12/2006 | Yo |
| 2007/0288981 | A1 | 12/2007 | Mitsuse et al. |
| 2007/0288982 | A1 | 12/2007 | Donahue |
| 2008/0022344 | A1 | 1/2008 | Riggsby |
| 2008/0040764 | A1 | 2/2008 | Weinstein et al. |
| 2008/0127287 | A1 | 5/2008 | Alkan et al. |
| 2008/0235750 | A1 * | 9/2008 | Urbanek et al. ............ 725/127 |
| 2009/0031391 | A1 | 1/2009 | Urbanek |
| 2009/0047917 | A1 | 2/2009 | Phillips et al. |
| 2009/0077608 | A1 | 3/2009 | Romerein et al. |
| 2009/0113510 | A1 * | 4/2009 | Knutson et al. ............ 725/127 |

FOREIGN PATENT DOCUMENTS

| | | | |
|---|---|---|---|
| JP | 55132126 | A | 10/1980 |
| JP | 57091055 | A | 6/1982 |
| JP | 58101582 | A | 6/1983 |
| JP | 05899913 | | 7/1983 |
| JP | 61157035 | A | 7/1986 |
| JP | 05191416 | A | 7/1993 |
| JP | 07038580 | A | 2/1995 |
| JP | 11069334 | A | 3/1999 |
| JP | 2001177580 | A | 6/2001 |
| JP | 2004080483 | A | 3/2004 |
| JP | 2005005875 | A | 1/2005 |
| JP | 2007166109 | A | 6/2007 |
| JP | 2007166110 | A | 6/2007 |
| WO | WO-0024124 | A1 | 4/2000 |
| WO | WO-0172005 | A1 | 9/2001 |
| WO | WO-0233969 | A1 | 4/2002 |
| WO | WO-02091676 | A1 | 11/2002 |
| WO | 2005008960 | A1 | 1/2005 |

OTHER PUBLICATIONS

PCT/US2010/024077; International Preliminary Report on Patentability. Date of Mailing: Oct. 13, 2011. 6 pp.

\* cited by examiner

AUTOMATIC RETURN PATH SWITCHING FOR A SIGNAL CONDITIONING DEVICE

CROSS REFERENCE TO RELATED APPLICATIONS

This application claims priority under 35 U.S.C.§119(e) to Provisional Patent Application No. 61/164,813, entitled "Automatic Return Path Switching For A Signal Conditioning Device" filed Mar. 30, 2009, which is incorporated herein by reference.

FIELD OF THE INVENTION

The present invention relates generally to devices for use in cable television ("CATV") systems that divide a main signal path of the CATV system into a forward path carrying a downstream bandwidth and a return path carrying an upstream bandwidth and, in particular, to devices that automatically alter a width of the return path.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, digital signals, optical signals, etc.) is passed from a supplier of the services to a user, and an upstream bandwidth (i.e., RF signals, digital signals, optical signals, etc.) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher frequencies within the total bandwidth of the CATV system, while the upstream bandwidth is relatively lower frequencies.

Traditionally, the width, in terms of the amount of frequencies included, of the downstream bandwidth far exceeds the width of the upstream bandwidth due to the nature of the services provided. For example, while the downstream bandwidth must accommodate all of the television programming, radio programming, internet downloading, and VOIP downloading, the upstream bandwidth is required to accommodate only internet uploading, system control signals from set top boxes, VOIP uploading, home security information, etc. Problems are arising, however, due to an increase in upstream bandwidth utilization caused by an increasing demand for higher speed internet uploading and an increasing demand for the VOIP telephone services.

In an effort to increase the upstream flow of data/signals, several suppliers have a plan to increase the width of the upstream bandwidth from 5-42 MHz to 5-85 MHz (e.g. from DOCSIS 2.0 to DOCSIS 3.0) to allow for a greater flow of the data/content carried by the upstream bandwidth. Along with such an increase, the width of the downstream bandwidth will likely be correspondingly decreased in width because the total width of available frequencies (i.e., the total bandwidth) is relatively fixed. Such a change is, however, very difficult to implement.

Increasing the width of the upstream bandwidth forces suppliers to push their downstream content into increasingly higher frequency portions of the downstream bandwidth. Unfortunately, these higher frequencies are much more susceptible to parasitic losses in signal strength caused by the signal transmission lines on or near the user's premise, the transmission line connectors on the user's premise, the devices connected to the signal transmission lines on the user's premise, etc.

In an attempt to address the issues resulting from parasitic losses currently occurring in the higher frequencies, providers and users alike have added relatively low-tech signal conditioning devices, such as drop amplifiers that amplify the downstream bandwidth and/or other devices that increase a signal-to-noise ratio of the downstream bandwidth, on or near the premise of the user to account for such losses. Each of these signal conditioning devices contain a set of diplexer filters that separate the main signal path into a forward path carrying the downstream bandwidth and a return path carrying the upstream bandwidth so that only the downstream bandwidth is amplified. Because this set of diplexer filters is fixed to create the typical return path having a width of 5-42 MHz, these often-used signal conditioning devices will prohibit any transition to a wider return path, such as that required by DOCSIS 3.0. Accordingly, any changes to increase the width of the upstream bandwidth must include the step of removing and/or replacing all of these signal conditioning devices that are installed on or near the premise of the user. Compounding the difficulty of implementing such a change, all of the signal conditioning devices must be replaced throughout the CATV system at a single, particular time. Further compounding these problems is the fact that the provider and/or the user may have no idea regarding whether a signal conditioning device is present on a particular premise and/or where the signal conditioning device is located on the premise. Accordingly, such an implementation of a broader upstream bandwidth would be time consuming, costly, and difficult to coordinate.

SUMMARY OF THE INVENTION

The present invention helps to facilitate any future changes to a CATV system where the upstream bandwidth is increased to cover a broader range of frequencies. The invention automatically determines when such a change has been made and automatically switches to accommodate the broader range of frequencies.

In accordance with one embodiment of the present invention, a premise signal conditioning device is provided that can be inserted into a signal transmission line of a CATV system on a premise of a user. The device includes at least a first diplexer set, each diplexer set comprising a supplier side diplexer and a premise side diplexer creating a return path for an upstream bandwidth and a forward path for a downstream bandwidth there between. The device further includes a detector configured to measure a level of signals present in a first segment of frequencies between the upstream bandwidth and the downstream bandwidth. The device further includes a switch controller configured to alter a width of the return path from a first width to a second width in response to a level of the signals exceeding a predetermined threshold level.

In accordance with one embodiment of the present invention, the device further includes a second diplexer set and a plurality of switches. Each switch includes first and second positions, the first position corresponding to the first diplexer set and the second position corresponding to the second diplexer set. The switch controller is configured to actuate the switched from the first position to the second position in response to a level of the signals exceeding the predetermined threshold level.

In accordance with one embodiment of the present invention, the first diplexer set is adjustable such that the width of the return path can be adjusted between the first position and the second position.

In accordance with one embodiment of the present invention, the switch controller is configured to alter the width of the upstream bandwidth from a first width to a second width in response to the level of the signals exceeding the predetermined threshold for a predetermined length of time.

In accordance with one embodiment of the present invention, the device further includes a signal amplifier mounted within the forward path.

In accordance with one embodiment of the present invention, the device further includes a housing having a supplier side and a premise side and a signal transmission line between the supplier side and the supplier side diplexer sets. The detector is connected to the signal transmission line, and the diplexer set, the detector, and the controller are located in the housing. Preferably, the signals pass from the signal transmission line to the detector through a band-pass filter. Preferably, the band-pass filter is configured to pass the first segment of frequencies between the upstream bandwidth and the downstream bandwidth.

In accordance with one embodiment of the present invention, the predetermined threshold is greater than a level of spurious signals within the first segment of frequencies. In accordance with another embodiment of the present invention, the predetermined threshold is similar to a level of desired frequencies within the upstream bandwidth. In accordance with another embodiment of the present invention, the predetermined threshold is greater than the level of desired frequencies within the upstream bandwidth.

In accordance with one embodiment of the present invention, the predetermined amount of time is less than one minute. In accordance with another embodiment of the present invention, the predetermined amount of time is greater than one minute.

In accordance with one embodiment of the present invention, a method is provided for conditioning signals of a downstream bandwidth. The method includes providing at least a first diplexer set. Each diplexer set includes a supplier side diplexer and a premise side diplexer creating a return path for an upstream bandwidth and a forward path for a downstream bandwidth there between. The method further includes detecting a level of signals from a first segment of frequencies between the upstream bandwidth and the downstream bandwidth. The method further includes changing the width of the return path after the level of the signals exceeds a predetermined threshold.

In accordance with one embodiment of the present invention, the method further includes providing a second diplexer set and providing a plurality of switches. Each switch includes first and second positions, the first position corresponding to the first diplexer set and the second position corresponding to the second diplexer set. Changing the width of the return path includes actuating the switches from the first position to the second position.

In accordance with one embodiment of the present invention, the step of changing the width of the return path is made after the level of the signals exceed the predetermined threshold for a predetermined amount of time.

In accordance with one embodiment of the present invention, the method further includes amplifying the downstream bandwidth in the forward path.

In accordance with one embodiment of the present invention, the method further includes providing a housing to contain at least the first diplexer set, the housing having a supplier side and a premise side.

In accordance with one embodiment of the present invention, the level of signals from the first segment of frequencies is detected in a signal transmission line arranged between the supplier side and the supplier side diplexer set. Preferably, the signals passing from the signal transmission line to the detector pass through a band-pass filter. Preferably, the band-pass filter is configured to pass the first segment of frequencies between the upstream bandwidth and the downstream bandwidth.

In accordance with one embodiment of the present invention, the predetermined threshold is greater than a level of spurious signals within the first segment of frequencies. In accordance with another embodiment of the present invention, the predetermined threshold is similar to a level of desired frequencies within the upstream bandwidth. In accordance with another embodiment of the present invention, the predetermined threshold is greater than a level of desired frequencies within the upstream bandwidth.

In accordance with one embodiment of the present invention, the predetermined amount of time is less than one minute. In accordance with another embodiment of the present invention, the predetermined amount of time is greater than one minute.

BRIEF DESCRIPTION OF THE DRAWINGS

For a further understanding of the objects of the invention, reference will be made to the following detailed description of the invention which is to be read in connection with the accompanying drawings, where:

FIG. 3 is a graphical representation of signal levels relative to an upstream bandwidth, a downstream bandwidth, and a segment there between;

FIG. 4 is a graphical representation of signal levels relative to a broadened upstream bandwidth, a narrowed downstream bandwidth, and a segment there between;

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
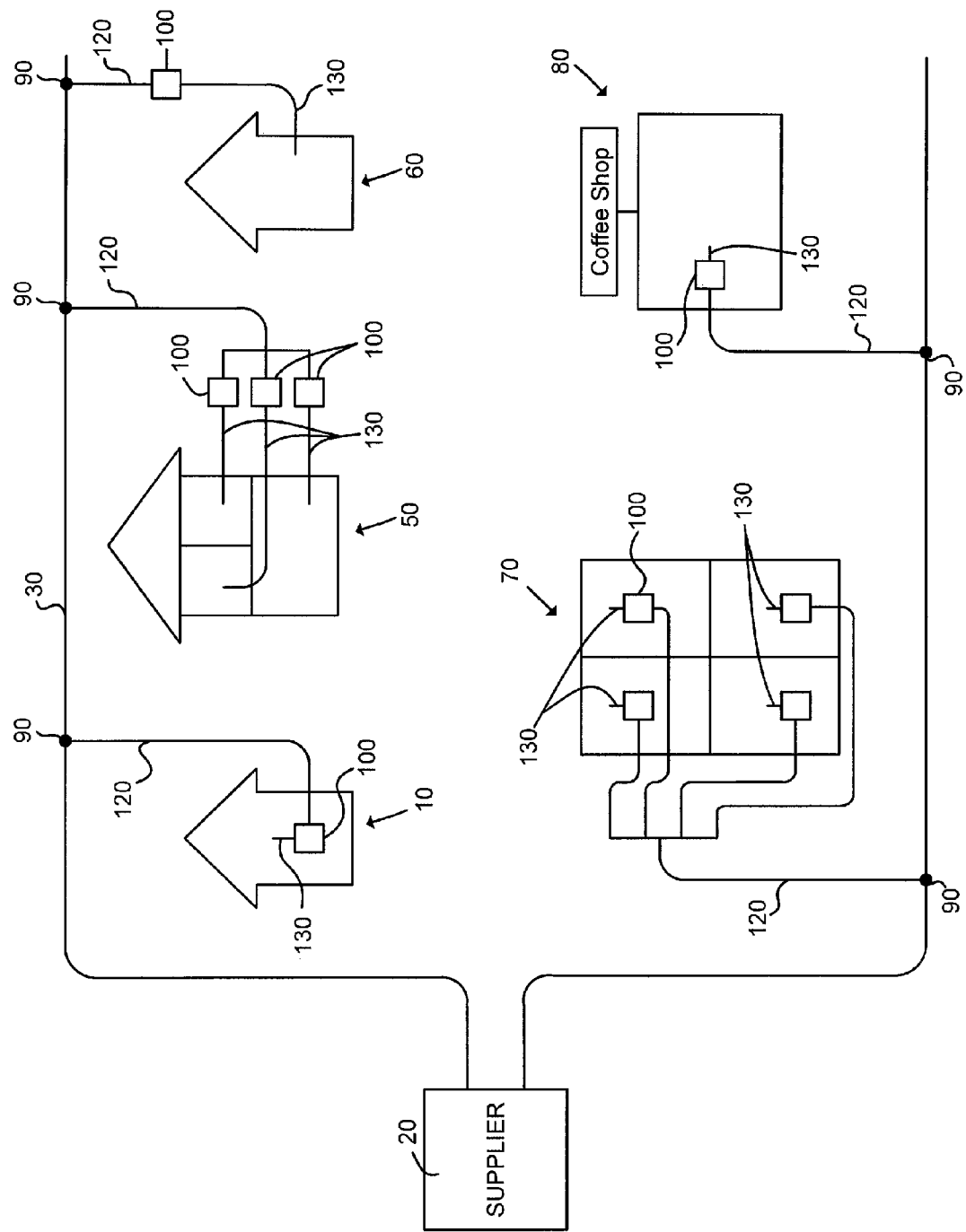
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, optical signals, etc., to a user through a main distribution system 30 and receives an upstream bandwidth, such as RF signals, digital signals, optical signals, etc., from a user through the same main distribution system 30. A tap 90 is located at the main distribution system 30 to allow for the passage of the downstream/upstream bandwidth from/to the main distribution system 30. A drop transmission line 120 is then used to connect the tap 90 to a house 10, 60, an apartment building 50, 70, a coffee shop 80, and so on. A signal conditioning device 100 of the present invention may be connected in series with the drop transmission line 120 between the tap 90 and a premise distribution system 130 in the user's premise.

Referring still to FIG. 1, it should be understood that the signal conditioning device 100 can be placed at any location between the tap 90 and the premise distribution system 130. This location can be conveniently located within a structure (e.g., house 10, apartment building 50, etc.), or external to the structure (e.g., house 60, apartment building 70, etc.). It should be understood that the signal conditioning device 100 can be placed at any location, such as the coffee shop 80 or other business, where CATV services, including internet services, VOIP services, or other unidirectional/bidirectional services are being used.

Figure 2:
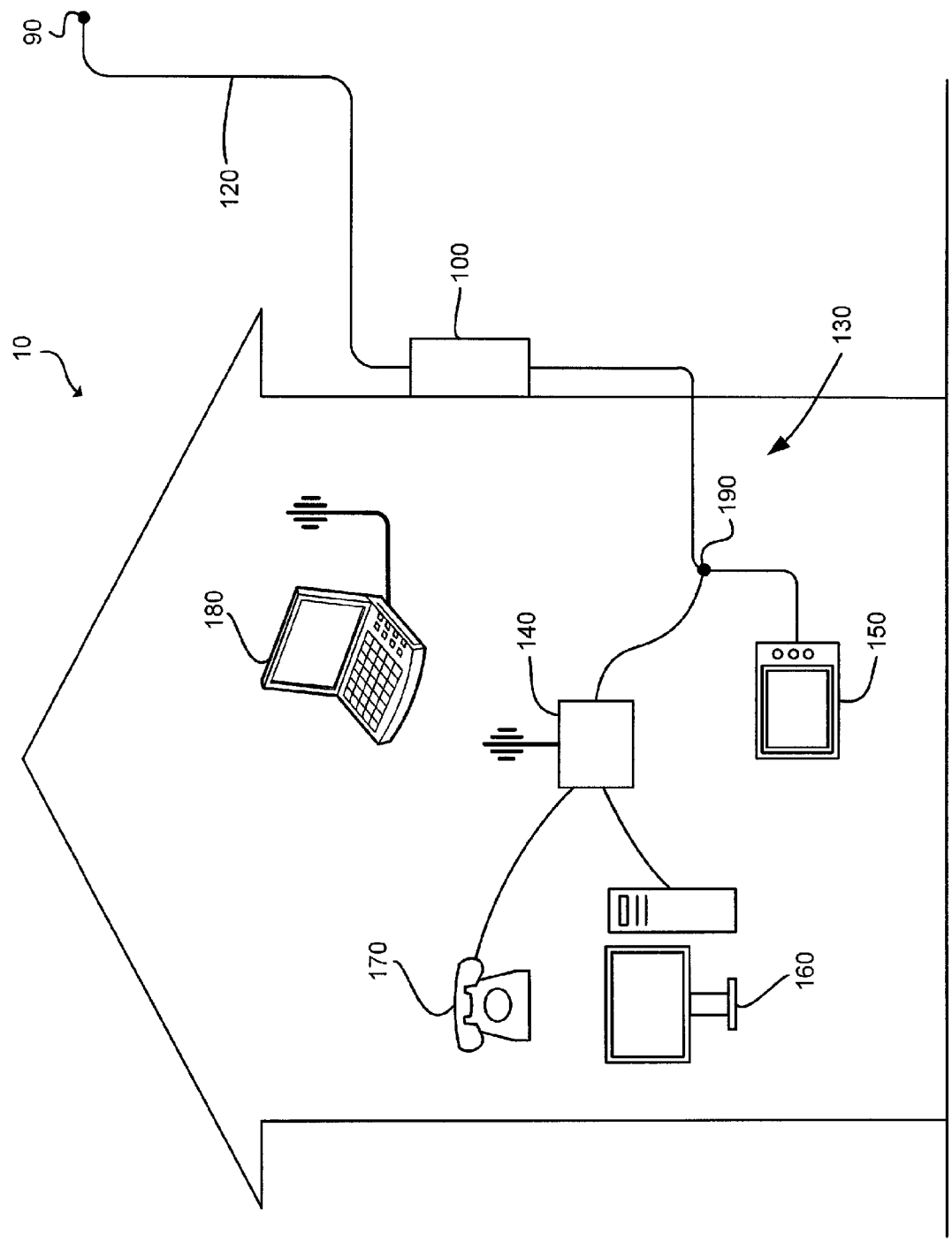
FIG. 2 is a graphical representation of a premise of a user arranged in accordance with an embodiment of the present invention.

As shown in FIG. 2, the premise distribution system 130 can be split using a splitter 190 so that the downstream/upstream bandwidth can pass to/from a television 150 and a modem 140 in accordance with practices well known in the art. The modem 140 can include VOIP capabilities affording telephone 170 services and can include a router providing internet services to a desktop computer 160 and a laptop computer 180, for example.

Additionally, it is common practice to provide a set-top box ("STB") or a set-top unit ("STU") for use directly with the television 150. For the sake of clarity, however, there is no representation of a STB or a STU included in FIG. 2. The STB and STU are mentioned here in light of the fact that many models utilize the upstream bandwidth to transmit information relating to "pay-per-view" purchases, billing, etc. Accordingly, it should be understood that even though FIG. 2 explicitly shows that there is only one signal conditioning device 100 used for the entire premise distribution system 130, it is envisaged that multiple signal conditioning devices 100 could be used at various locations throughout premise distribution system 130 if/when additional amplification of the downstream bandwidth is desired.

The goal of placing the signal conditioning device 100 in one of the locations described above is to increase the overall quality of the downstream bandwidth by placing the signal conditioning device 100 as close to the end use devices (i.e. the television 150, the modem 140, etc.) as practical. The close proximity allows for the signal conditioning device 100 to account for the parasitic losses occurring over the length of the drop transmission line 120, while minimizing the distance and associated parasitic losses to the end use devices. It is also foreseeable that one of the signal conditioning devices 100 could be located in the premise very near each end use device so that nearly all of the parasite losses can be accounted for by the signal conditioning device 100. Such an arrangement could be somewhat costly for the average user, as the arrangement could result in the purchase of a large number of signal conditioning devices 100.

Figure 3:
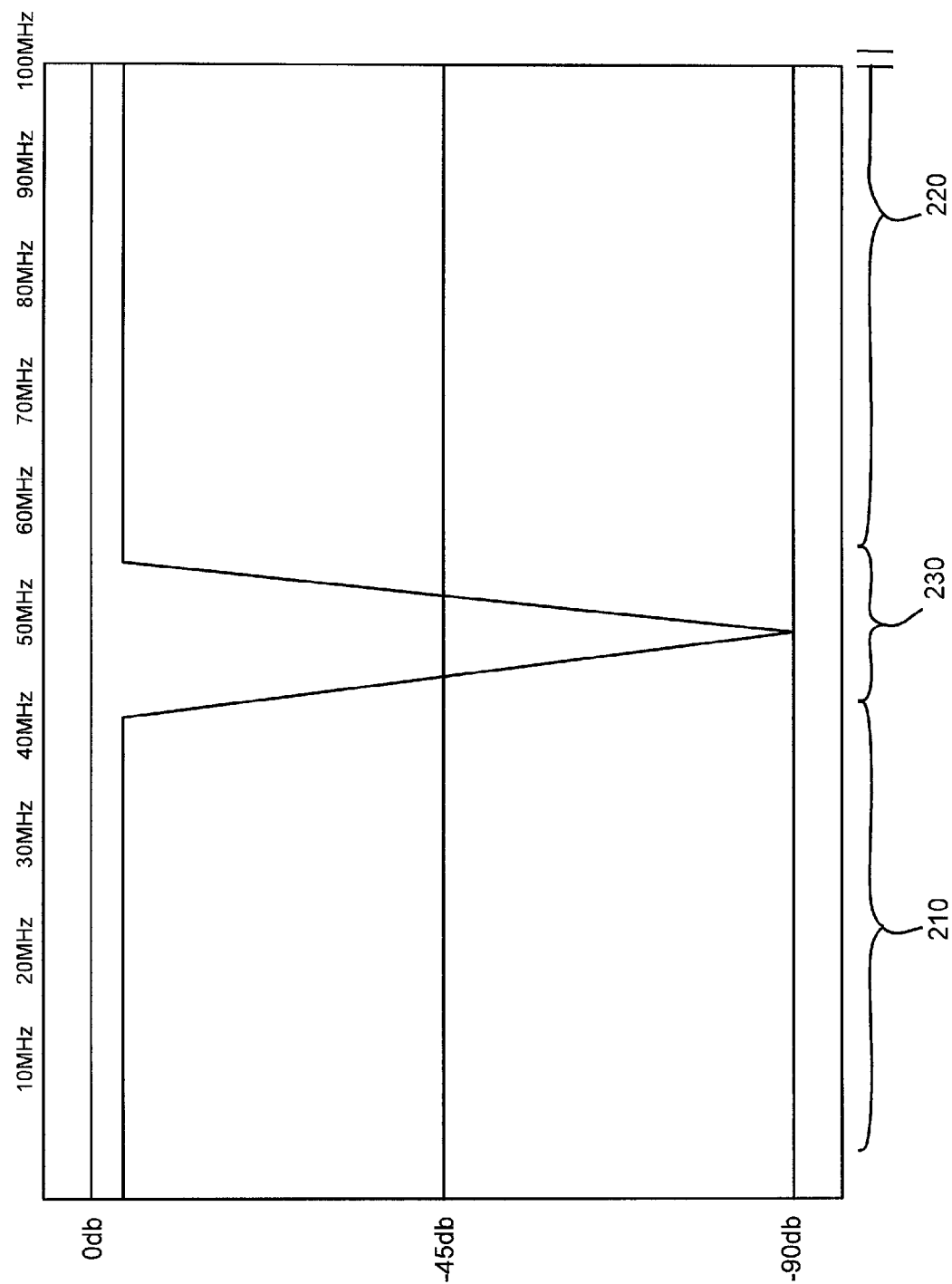

Referring now to FIG. 3, the inventors discovered that there is a segment 230 of frequencies located between an upstream bandwidth 210 and a downstream bandwidth 220 that includes very few signals due to an overlap, which is inherent when diplex filters are used to create a return path and a forward path. For example, in the current CATV system, the upstream bandwidth 210 includes frequencies below 42 MHz and the downstream bandwidth 220 includes frequencies above 54 MHz. Accordingly, the segment 230 of frequencies that are attenuated in the current CATV system is located between 42 MHz and 54 MHz, and likely includes a maximum amount of attenuation near a midpoint between 42 MHz and 54 MHz. For the sake of clarity, this segment 230 of frequencies that are attenuated in the current CATV system will be referred to hereafter as the first segment of frequencies 230.

While this first segment of frequencies 230 is shown as a perfect "V" shape having similar slopes on each side and having a focused point at the midpoint, it should be understood that such slopes and the midpoint may vary greatly depending on the type and quality of the diplexers utilized throughout the CATV system. It is likely that the two slopes defining the first segment of frequencies 230 will be different from one another such that the point of lowest signals is not positioned at the midpoint between 42 MHz and 54 MHz. Further, due to inherent noise/spurious signals present in the CATV system, the level of the signals at the midpoint, or other area of lowest signals, will likely be significantly greater than −90 db.

Figure 4:
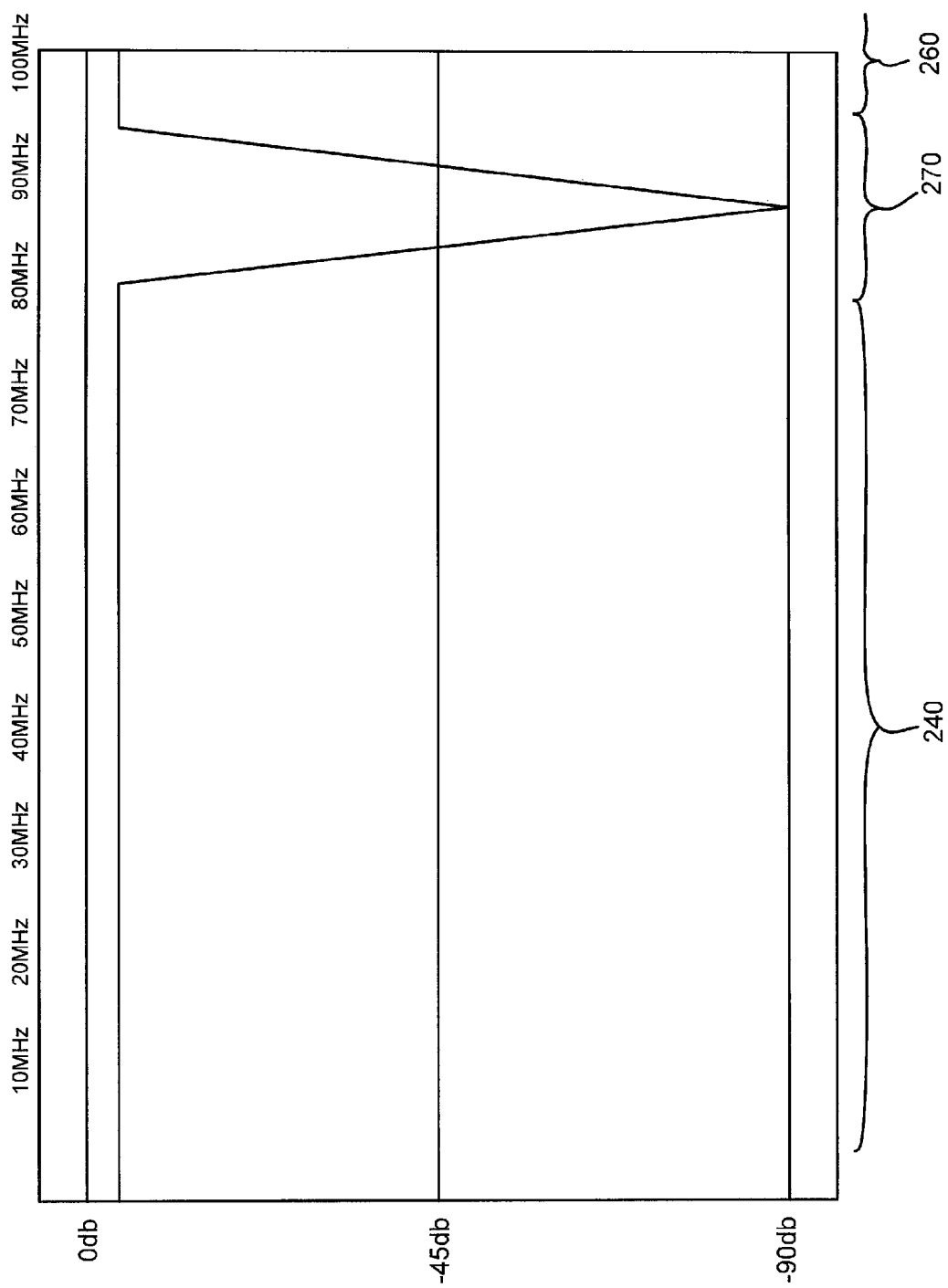

Referring now to FIG. 4, the inventors discovered that the first segment of frequencies 230 (FIG. 3) occurring between 42 MHz and 54 MHz will no longer be attenuated when a broadened upstream bandwidth 240 is created that includes the frequencies up to 85 MHz (or other amount as determined by future standards). Instead, a new segment 270 of frequencies will occur in a frequency range above the broadened upstream bandwidth 240 and below an altered downstream bandwidth 260.

In light of the forgoing, the inventors discovered that if there are significant signals present throughout the first segment of frequencies 230 between 42 MHz and 54 MHz, there has likely been a change in the CATV system to broaden the width of the upstream bandwidth to a size as represented, for example, in FIG. 4. Accordingly, the inventors have determined that if there are significant signals present throughout first segment 230 of frequencies between 42 MHz and 54 MHz, the signal conditioning device 100 should change or remove any diplexer set being utilized therein to accommodate the original upstream bandwidth 210 (FIG. 3) in favor of a diplexer set that accommodates the new, broadened upstream bandwidth 240.

Figure 5:
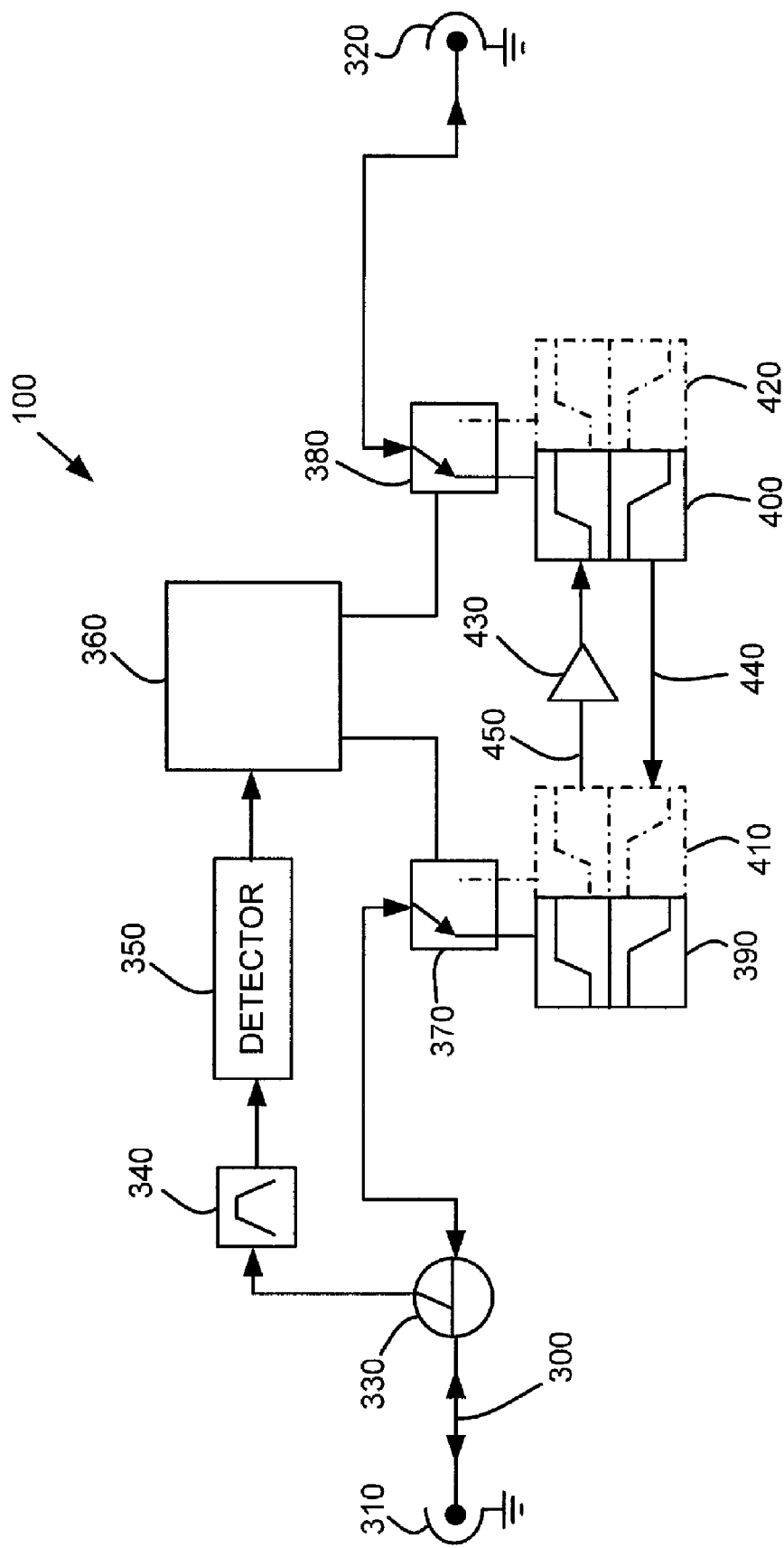
FIG. 5 is a graphical representation of a signal conditioning device made in accordance with one embodiment of the present invention.

As shown in FIG. 5, one embodiment of the signal conditioning device 100 of the present invention includes supplier side 310 and a premise side 320. The supplier side 310 is positioned to receive the downstream bandwidth from the supplier 20 (FIG. 1) and to send the upstream bandwidth to the supplier 20. The premise side 320 is positioned to send the downstream bandwidth to the user and to receive the upstream bandwidth from the user. Each of the supplier side 310 and the premise side 320 can include a traditional threaded 75 ohm connector so that the signal conditioning device 100 can be easily placed in series with the drop transmission line 120 and the premise distribution system 130. Alternatively, each of the supplier side 310 and the premise side 320 may include a proprietary connector to hinder attempts at tampering with or theft of the signal conditioning device 100. Other connectors may also be used depending on the type and/or size of the drop transmission line 120, the type and/or size of the premise distribution system 130, or the impedance of the system.

The signal conditioning device 100 according to the present embodiment further includes a tap 330 located on a signal transmission line 300 near the supplier side 310, which is located opposite the premise side 320. Signals passing from the tap 330 then pass through a band-pass filter 340, which has been tuned to pass only a selected range of frequencies. In the present instance, the band-pass filter 340 is tuned to pass only those signals from the first segment of frequencies 230 (FIG. 3) between 42 MHz and 54 MHz. Any signals present within this small range of frequencies are then passed through to a detector 350, which directs a switch controller 360 to actuate a pair of switches 370, 380 in a manner depending on whether signals are present in the first segment of frequencies 230.

For example, when there are no significant signals present within the first segment of frequencies 230, as would be the case in the current configured CATV system, the switch controller 360 allows the switches 370, 380 to select a first set of diplexers 390, 400, which includes a first supplier side diplexer 390 and a first premise side diplexer 400. In this example, the first set of diplexers 390, 400 is tuned for the current CATV system where the upstream bandwidth includes frequencies below 42 MHz and the downstream bandwidth includes frequencies above 54 MHz. The first set of diplexers 390, 400 creates a return path 440 for the upstream bandwidth and a forward path 450 for the downstream bandwidth between the first supplier side diplexer 390 and the first premise side diplexer 400.

When there are significant signals present within the first segment of frequencies 230, as would be the case when the upstream bandwidth is broadened, the switch controller 360 directs the switches 370, 380 to select a second set of diplexers 410, 420, which includes a second supplier side diplexer 410 and a second premise side diplexer 420. In this example, the second set of diplexers 410, 420 is tuned for a future CATV system where the upstream bandwidth includes frequencies below 85 MHz and the downstream bandwidth includes frequencies above 98 MHz.

The signal conditioning device 100 includes an amplifier 430 located in series or in parallel with the forward path 450 between the first and second supplier side diplexers 390, 410 and the first and second premise side diplexers 400, 420 such that the downstream bandwidth passes through the amplifier 430 regardless of which set of diplexers is active. The amplifier 430 can take the form of any of the known signal amplifiers. Further, there may be one amplifier relative to each set of diplexers such that there are two amplifiers 430. Even further, the amplifier could be replaced or augmented with another type of circuit such as a noise filter, or any other of the known signal conditioners.

Figure 6:
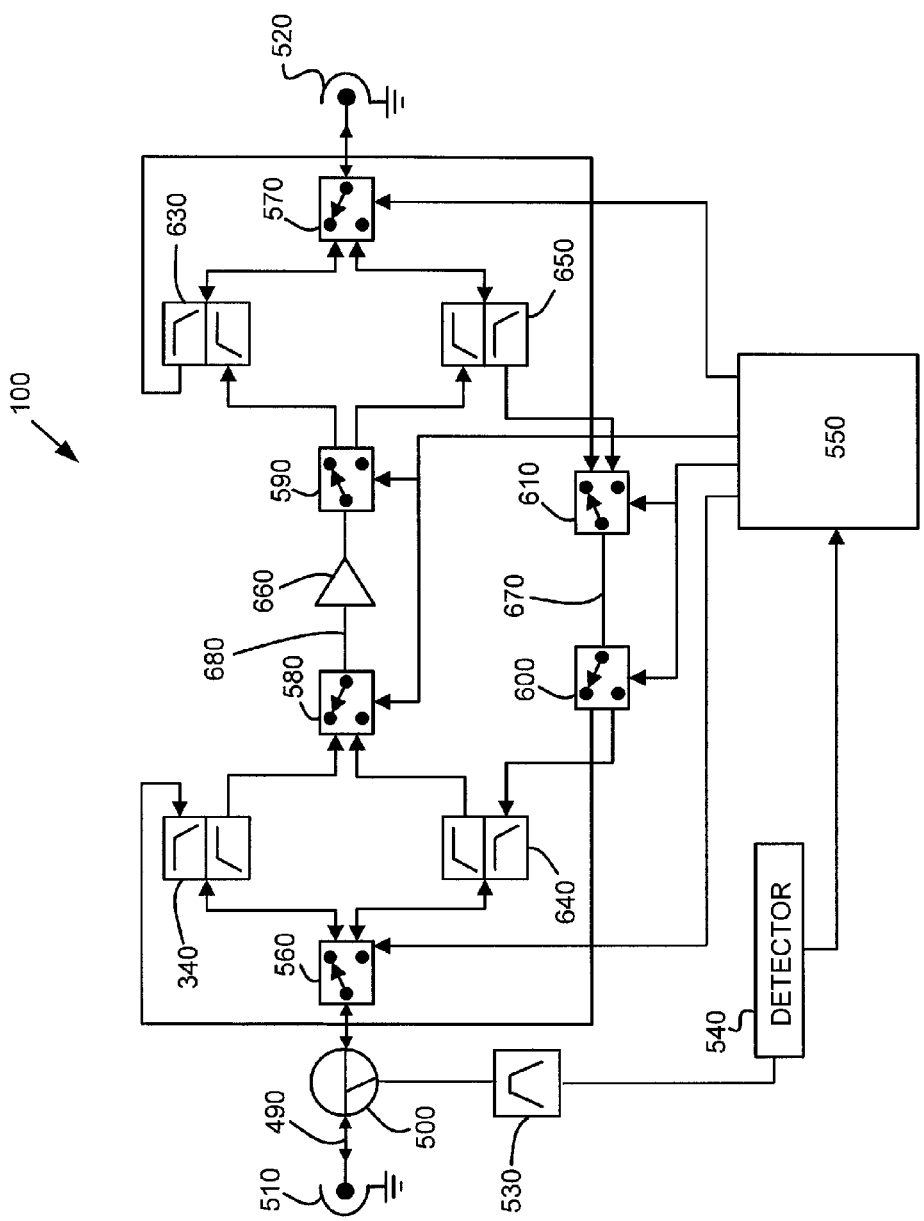
FIG. 6 is a graphical representation of a signal conditioning device made in accordance with another embodiment of the present invention.

As shown in FIG. 6, another embodiment of the signal conditioning device 100 of the present invention includes a supplier side 510 and a premise side 520. The supplier side 510 is positioned to receive the downstream bandwidth from the supplier 20 (FIG. 1) and to send the upstream bandwidth to the supplier 20. The premise side 520 is positioned to send the downstream bandwidth to the user and to receive the upstream bandwidth from the user. Each of the supplier side 510 and the premise side 520 can include a traditional threaded 75 ohm connector so that the signal conditioning device 100 can be easily placed in series with the drop transmission line 120 (FIG. 1) and the premise distribution system 130 (FIG. 1). As discussed above, other connectors may also be used depending on the type and/or size of the drop transmission line 120, the type and/or size of the premise distribution system 130, or the impedance of the system.

The signal conditioning device 100 according to the present embodiment further includes a tap 500 located on a signal transmission line 490 near the supplier side 510, which is located opposite the premise side 520. Signals passing from the tap 500 then pass through a band-pass filter 530, which has been tuned to pass only a selected range of frequencies. In the present instance, the band-pass filter 530 is tuned to pass only those signals from the first segment of frequencies 230 (FIG. 3) between 42 MHz and 54 MHz. Any signals present within this small range of frequencies are then passed through to a detector 540, which directs a switch controller 550 to actuate switches 560, 570, 580, 590, 600, 610 in a manner depending on whether signals are present in the first segment of frequencies 230.

For example, when there are no significant signals present within the first segment of frequencies 230, as would be the case in the current CATV system, the switch controller 550 allows the switches 560, 570, 580, 590, 600, 610 to select a first set of diplexers 620, 630, which includes a first supplier side diplexer 620 and a first premise side diplexer 630. In this example, the first set of diplexers 620, 630 is tuned for the current CATV system where the upstream bandwidth includes frequencies below 42 MHz and the downstream bandwidth includes frequencies above 54 MHz. The first set of diplexers 620, 630 creates a return path 670 and a forward path 680 between the first supplier side diplexer 620 and the first premise side diplexer 630.

When there are significant signals present within the first segment of frequencies 230, as would be the case when the upstream bandwidth is broadened, the switch controller 550 directs the switches 560, 570, 580, 590, 600, 610 to select a second set of diplexers 640, 650, which includes a second supplier side diplexer 640 and a second premise side diplexer 650. In this example, the second set of diplexers 640, 650 is tuned for a future CATV system where the upstream bandwidth includes frequencies below 85 MHz and the downstream bandwidth includes frequencies above 98 MHz.

The signal conditioning device 100 includes an amplifier 660 located in series (shown) or in parallel with the forward path 680 between the first and second supplier side diplexers 620, 640 and the first and second premise side diplexers 630, 650 such that the downstream bandwidth passes through the amplifier 660 regardless of which set of diplexers is active. As discussed above, the amplifier 660 can take the form of any of the known signal amplifiers. Further, the amplifier 660 could be replaced or augmented with another type of circuit such as a noise filter, or any of the other known signal conditioners.

Figure 7:
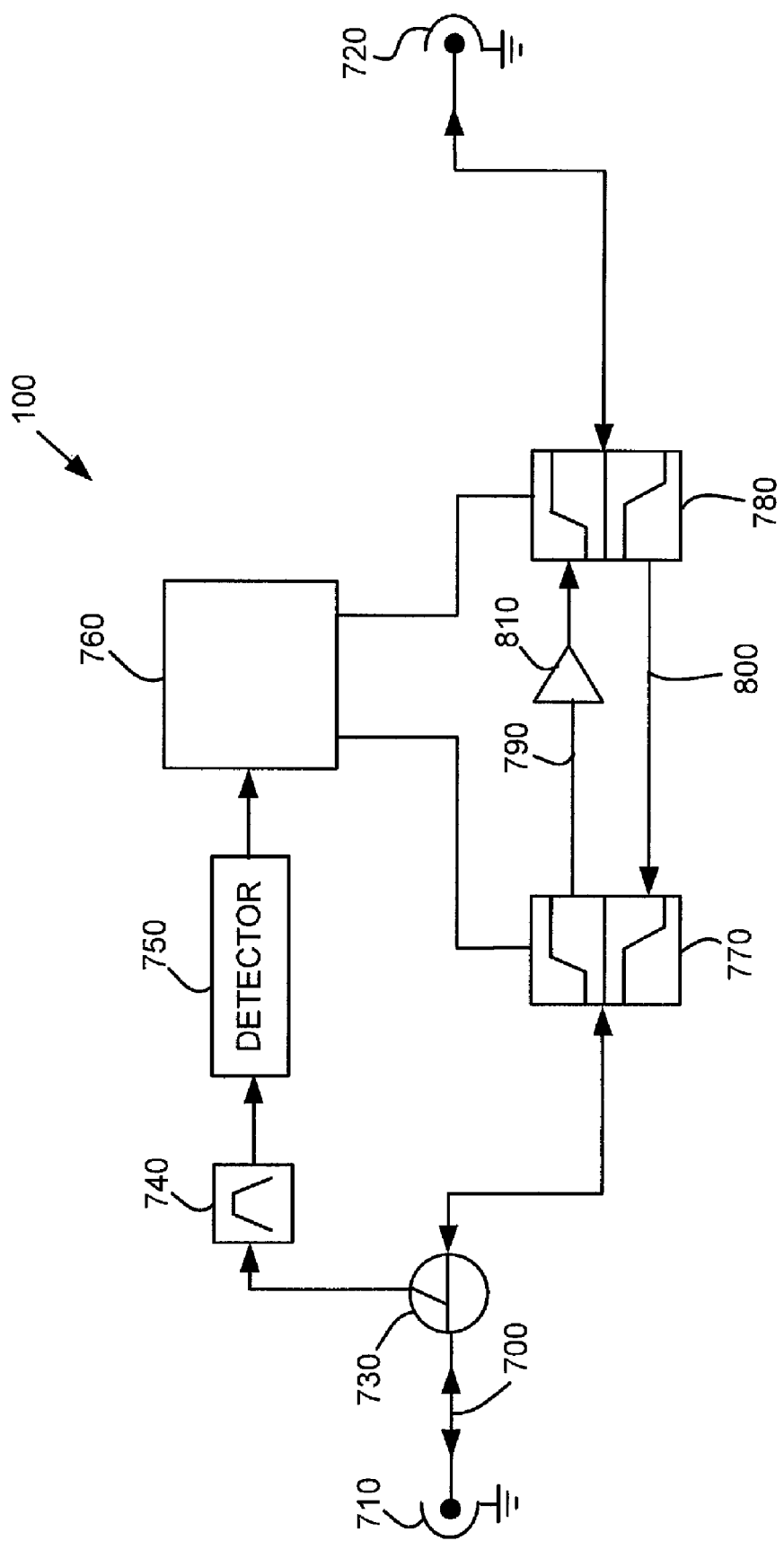
FIG. 7 is a graphical representation of a signal conditioning device made in accordance with another embodiment of the present invention.

As shown in FIG. 7, another embodiment of the signal conditioning device 100 of the present invention includes supplier side 710 and a premise side 720. The supplier side 710 is positioned to receive the downstream bandwidth from the supplier 20 (FIG. 1) and to send the upstream bandwidth to the supplier 20. The premise side 720 is positioned to send the downstream bandwidth to the user and to receive the upstream bandwidth from the user. As discussed above, each of the supplier side 710 and the premise side 720 can include a traditional threaded 75 ohm connector, a proprietary connector, or other connector so that the signal conditioning device 100 can be easily placed in series with the drop transmission line 120 and the premise distribution system 130.

The signal conditioning device 100 according to the present embodiment further includes a tap 730 located on a signal transmission line 700 near the supplier side 710, which is located opposite the premise side 720. Signals passing from the tap 730 then pass through a band-pass filter 740, which has been tuned to pass only a selected range of frequencies. In the present instance, the band-pass filter 740 is tuned to pass only those signals from the first segment of frequencies 230 (FIG. 3) between 42 MHz and 54 MHz. Any signals present within this small range of frequencies are then passed through to a detector 750, which directs a controller 760 to adjust each of a supplier side diplexer 770 and a premise side diplexer 780.

In either of the embodiments represented in FIGS. 5 and 6, could include many more than two sets of diplexers. It is foreseeable that the same device could be used in a variety of CATV systems, each having differing width of return paths, by providing a deferent set of diplexers for each possibility. Along these lines the high pass filter 340, 530 and the detector 350, 540 may be made to be able to look at segments of frequencies that have differing ranges of frequencies to allow the present device to be suitable in a variety of different applications.

For example, when there are no significant signals present within the first segment of frequencies 230, as would be the case in the current configured CATV system, the controller 760 adjusts each of the supplier side diplexer 770 and the premise side diplexer 780 to create a return path 800 that passes the upstream bandwidth including frequencies below 42 MHz and to create a forward path 790 that passes the downstream bandwidth including frequencies above 54 MHz.

When there are significant signals present within the first segment of frequencies 230, as would be the case when the upstream bandwidth is broadened, the controller 760 adjusts each of the supplier side diplexer 770 and the premise side diplexer 780 to create the return path 800 that passes the upstream bandwidth including frequencies below 85 MHz and to create the forward path 790 that passes the downstream bandwidth including frequencies above 98 MHz.

In this embodiment, each of the supplier side diplexer 780 and the premise side diplexer 780 may be adjustable over a wide range of frequencies to account for a variety of different potential return path widths. Similarly, the band path filter 740 and detector 750 may be made to be able to look at segments of frequencies that have differing ranges of frequencies to allow the present device to be suitable in a variety of different applications.

It should be noted that the frequency ranges (i.e., below 42 MHz, above 54 MHz, etc) are only references and can vary greatly between North American, Latin American, Asian, and European CATV systems, and they can vary between CATV systems located solely within the Unites States. A point to be made here is that there will be a first segment of frequencies between the upstream bandwidth and the downstream bandwidth regardless of the CATV system. It is this segment of frequencies, regardless of the actual frequency ranges, that is being examined for significant signals.

Further, it should be noted that the term significant signals can vary greatly depending on the CATV system. For example, there are typically at least some spurious signals present in the main distribution system 30 of any CATV system. For proper functioning of any CATV system, the level of desirable signals, such as modem signals, must be significantly greater than the level spurious signals. Accordingly, the detector 350 (FIG. 5), 540 (FIG. 6) and/or the switch controller 360 (FIG. 5), 550 (FIG. 6) should include a threshold value, which is set such that it/they are triggered by a signal level that is greater than the expected spurious signals and equal to or less then the level of the desirable signals. This threshold value is the signal level that must be met or exceeded to trigger a change in the diplexers. For example, there is very likely to be spurious signals that raise the signal level above the minimum room-temperature noise in a perfect CATV system of −59 dBmV such that the threshold value should be set at least above −50 dBmV. Further, because of inherent signal loss a threshold a threshold value of greater than 0 dBmV may not be achieved. Accordingly, an appropriate threshold value may be found between −40 dBmV and −10 dBmV. It should be noted that, as described below, the change in the diplexer may require that the level of the signals in the first segment of frequencies 230 exceed the threshold value for a predetermined amount of time (e.g., 1 second, 1 minute, 6 hours, 1 day, etc.) before a change in the diplexers is made.

Additional features may be added to the detector 350, 540 to account for the variability in the levels of the spurious signals and the desirable signals. For example, the level of spurious signals in one portion of a particular CATV system may be greater than in another portion. Accordingly, an adjustment mechanism, such as a dashpot, a mechanical dial, an electronic interface, etc. can be incorporated to allow a technician the ability to selectively adjust the threshold value for each unit.

Additional features may be added to the band-pass filter 340 (FIG. 5), 530 (FIG. 5) to account for variability on the diplexer sets used throughout the main distribution system. For example, certain diplexer sets may have a smaller range of attenuated frequencies between the upstream bandwidth and the downstream bandwidth. Accordingly, it may be beneficial to narrow the range of frequencies passed by the band-pass filter 340, 530 so that inaccurate signal level readings are not taken. It should be understood that instead of merely altering the width of the range, the adjustment could set a beginning point and an end point for the range of frequencies to be passed. Accordingly, an adjustment mechanism, such as a dashpot, a mechanical dial, an electronic interface, etc. can be incorporated to allow a technician the ability to selectively adjust the width and/or the endpoints of the range of frequencies to be passed by the band-pass filter 340, 530.

Additionally, there may be logic provided in the detector 350, 540 and/or the switch controller 360, 550 to require that the threshold value be exceeded for a period of time before the switch controller activates the second set of diplexers 410, 420 (FIG. 5), 640, 650 (FIG. 6). Such an addition may be helpful in light of the fact that the switch from the first set of diplexers 390, 400 (FIG. 5), 620, 630 (FIG. 6) to the second set of diplexers 410, 420, 640, 650 may occur only once, as it is unlikely that the CATV service provider will transition to a smaller upstream bandwidth after a broader upstream bandwidth is implemented. Along these lines, the detector 350, 540 and/or the switch controller 360, 550 could be configured to require a relatively long time span (e.g., 6 hours, 1 day, etc.) of signals within the first segment of frequencies 230 having a level that exceeds the threshold value before activating the second diplexer set 410, 420, 640, 650.

Another option along these lines is to configure the detector 350, 540 and/or the switch controller 360, 550 in such a way that it requires a relatively strong signal, possibly having a higher level than the typical desirable signals (e.g. +10 dBmV), for an amount of time before activating the second diplexer set 410, 420, 640, 650. Such a signal could be sent by the CATV provider during the overnight hours of a day when a broader upstream bandwidth is to be implemented. With such a high threshold, the predetermined amount of time could be much shorter (e.g. 1 minute, 1 hour, etc) or even 1 second.

Another option would be to add some sort of reset functionality to the signal conditioning device 100. It is understood that there is a chance that the second diplexer set 410, 420, 640, 650 could be inadvertently activated. The reset functionality could take the form of a physical reset button, a sequence of physical actions, etc. The detector 350, 540 and/or the switch controller 360, 550 could also be configured with the ability to reset based on an information signal sent by the CATV provider.

While the present invention has been particularly shown and described with reference to the preferred mode as illustrated in the drawings, it will be understood by one skilled in the art that various changes in detail may be effected therein without departing from the spirit and scope of the invention as defined by the claims.

The invention claimed is:

1. A premise signal conditioning device that can be inserted into a signal transmission line of a CATV system on a premise of a user, said device comprising:
   at least a first diplexer set, each diplexer set comprising a supplier side diplexer and a premise side diplexer creating a return path for an upstream bandwidth and a forward path for a downstream bandwidth there between;
   a detector configured to measure a level of signals present in a first segment of frequencies between the upstream bandwidth and the downstream bandwidth, wherein the detector comprises an adjustment mechanism configured to selectively adjust a predetermined threshold level; and
   a switch controller configured to alter a width of the return path from a first width to a second width in response to a level of the signals exceeding the predetermined threshold level.

2. The device of claim 1 further comprising:
   a second diplexer set; and
   a plurality of switches, each switch comprising first and second positions, the first position corresponding to the first diplexer set and the second position corresponding to the second diplexer set,
   wherein the switch controller is configured to actuate the switches from the first position to the second position in response to a level of the signals exceeding the predetermined threshold level.

3. The device of claim 1, wherein the first diplexer set is adjustable such that the width of the return path can be adjusted between the first position and the second position.

4. The device of claim 1, wherein the switch controller is configured to alter the width of the upstream bandwidth from a first width to a second width in response to the level of the signals exceeding the predetermined threshold for a predetermined length of time.

5. The device of claim 4, wherein the predetermined amount of time is less than one minute.

6. The device of claim 4, wherein the predetermined amount of time is greater than one minute.

7. The device of claim 1 further comprising a signal amplifier mounted within the forward path.

8. The device of claim 1 further comprising:
   a housing having a supplier side and a premise side; and
   a signal transmission line between the supplier side and the supplier side diplexer sets, wherein the detector is connected to the signal transmission line, and
   wherein the diplexer set, the detector, and the controller are located in the housing.

9. The device of claim 8, wherein the signals pass from the signal transmission line to the detector through a band-pass filter.

10. The device of claim 9, wherein the band-pass filter is configured to pass the first segment of frequencies between the upstream bandwidth and the downstream bandwidth.

11. The device of claim 1, wherein the predetermined threshold is greater than a level of spurious signals within the first segment of frequencies.

12. The device of claim 1, wherein the predetermined threshold is similar to a level of desired frequencies within the upstream bandwidth.

13. The device of claim 1, wherein the predetermined threshold is greater than the level of desired frequencies within the upstream bandwidth.

14. A method for conditioning signals of a downstream bandwidth, the method comprising:
   providing at least a first diplexer set, each diplexer set comprising a supplier side diplexer and a premise side diplexer creating a return path for an upstream bandwidth and a forward path for a downstream bandwidth there between;
   detecting a level of signals from a first segment of frequencies between the upstream bandwidth and the downstream bandwidth;
   selectively adjusting a predetermined threshold level;
   changing the width of the return path after the level of the signals exceeds predetermined threshold level.

15. The method of claim 14 further comprising:
   providing a second diplexer set; and
   providing a plurality of switches, each switch comprising first and second positions, the first position corresponding to the first diplexer set and the second position corresponding to the second diplexer set,
   wherein changing the width of the return path comprises actuating the switches from the first position to the second position.

16. The method of claim 14, wherein the step of changing the width of the return path is made after the level of the signals exceed the predetermined threshold for a predetermined amount of time.

17. The method of claim 16, wherein the predetermined amount of time is less than one minute.

18. The method of claim 16, wherein the predetermined amount of time is greater than one minute.

19. The method of claim 14 further comprising amplifying the downstream bandwidth in the forward path.

20. The method of claim 14 further comprising providing a housing to contain at least the first diplexer set, the housing having a supplier side and a premise side.

21. The method of claim 14 wherein the level of signals from the first segment of frequencies is detected in a signal transmission line arranged between the supplier side and the supplier side diplexer set.

22. The method of claim 21, wherein the signals passing from the signal transmission line to the detector pass through a band-pass filter.

23. The method of claim 22, wherein the band-pass filter is configured to pass the first segment of frequencies between the upstream bandwidth and the downstream bandwidth.

24. The method of claim 14, wherein the predetermined threshold is greater than a level of spurious signals within the first segment of frequencies.

25. The method of claim 14, wherein the predetermined threshold is similar to a level of desired frequencies within the upstream bandwidth.

26. The method of claim 14, wherein the predetermined threshold is greater than a level of desired frequencies within the upstream bandwidth.

* * * * *